United States Patent [19]
Klauber

[11] Patent Number: 5,143,462
[45] Date of Patent: Sep. 1, 1992

[54] ERGONOMICALLY EFFECTIVE BACKSPACING METHOD

[75] Inventor: Robert D. Klauber, Fairfield, Iowa

[73] Assignee: Keyboard Advances, Inc., Fairfield, Iowa

[21] Appl. No.: 339,075

[22] Filed: Apr. 14, 1989

[51] Int. Cl.⁵ .......................... B41J 5/08; B41J 19/62
[52] U.S. Cl. .................................... 400/486; 400/308
[58] Field of Search ............... 400/308, 301, 485, 486, 400/697, 697.1, 310, 312

[56] References Cited

U.S. PATENT DOCUMENTS

| | | | |
|---|---|---|---|
| 3,217,850 | 11/1965 | Frechette et al. | 400/308 X |
| 3,236,352 | 2/1966 | Schacht | 400/308 X |
| 3,270,852 | 9/1966 | Fondiller | 400/697.1 X |
| 3,490,572 | 1/1970 | Smith | 400/310 X |
| 3,799,316 | 3/1974 | Davidge et al. | 400/301 X |
| 3,967,273 | 6/1976 | Knowlton | 400/486 X |
| 4,121,048 | 10/1978 | Dev Choudhury | 400/486 X |
| 4,245,918 | 1/1981 | Bowles et al. | 400/697.1 X |
| 4,795,349 | 1/1989 | Sprague et al. | 400/485 X |
| 4,824,268 | 4/1989 | Diernisse | 400/486 |

FOREIGN PATENT DOCUMENTS 728149 7/1952 United Kingdom .

OTHER PUBLICATIONS

Epson ® Equity TM II+, 1988 by Seiko Epson Corporation Chapter 2.
Reliable Catalog 1991 Edition, p. 107 Smith Corona Spell-Right TM.

Primary Examiner—Edgar S. Burr
Assistant Examiner—Moshe I. Cohen
Attorney, Agent, or Firm—Bell, Seltzer, Park & Gibson

[57] ABSTRACT

A method for backspacing and/or backspacing/erasing on a computer, electronic, or other keyboard comprises activation of the backspacing function via thumb movement. Such activation can be accomplished more easily, more efficiently, and more ergonomically effectively than prior art methods because it can be done without averting the eyes from the text copy and does not entail moving or uncomfortable stretching of the hands.

9 Claims, 4 Drawing Sheets

ERGONOMICALLY EFFECTIVE BACKSPACING METHOD

BACKGROUND OF THE INVENTION

Field of the Invention

This invention relates to a backspace/erase key for computer, electric typewriter, and other system keyboards, and more particularly, to an improved method for backspacing and erasing which is easier to use, more ergonomically effective, and permits a touch typist to erase mistakes without having to look at the keyboard.

2. Description of Prior Art

Modern day computer and electric typewriter keyboards containing a plurality of rows of alphanumeric keys have transformed the backspace key of the manual typewriter into a combined function of backspacing plus erasing. This has the advantage of automatically erasing mistakes as one backspaces and is generally considered by users to be an added convenience in typing.

Yet heretofore, with the standard computer or electric typewriter design, the backspace/erase key is located in the far upper right portion of the keyboard, and a touch typist who realizes he has made a mistake must avert his eyes from the copy to the keyboard in order to locate and use the key. Typically, the typist must 1) avert the eyes from the copy to the keyboard,
2) remove the hands from their accustomed location in touch typing position (FIG. 1).
3) locate and depress the backspace/erase key,
4) return hands to original position, and then
5) search the copy to find the proper location to begin inputting again.

This is not only an inconvenience but a waste of valuable time as well. Further, it adds to typist fatigue which can lead directly to lower efficiency and poorer quality work.

Some more recent keyboard designs 10 as shown in FIG. attempt to ameliorate this problem by enlarging the backspace/erase key 11 and moving it somewhat closer to the right little finger's resting location. These attempts have been only a minor improvement since the large "return" key 12 is located directly to the right of the right little finger and takes up most of the space which that finger can reach. Even with such designs, most users must still stretch somewhat uncomfortably to reach the backspace/erase key 11 and/or avert their eyes to locate it.

There is therefore, at present, no comfortable, easy means to backspace/erase mistakes made on computer or electronic typewriter keyboards without moving one's eyes off of the copy and onto the keyboard.

OBJECTS AND ADVANTAGES OF THE INVENTION

Accordingly, several objects and advantages of my novel method for backspace/erase are to save the typist the need to avert the eyes from the copy and to avoid stretching uncomfortably, thereby improving ease of use, saving of wasted time, reducing fatigue, and increasing typing efficiency.

Further objects and advantages of the invention will become apparent from a consideration of the ensuing description of it.

SUMMARY OF THE INVENTION

This backspace/erase key invention solves all of the problems associated with such a key on prior art keyboards.

My invention takes advantage of the facts (1) that in present designs one or both thumbs are used solely to depress the space bar and (2) that the spacebar 13 (FIG. 1) typically takes up by far the most space of any key on the keyboard. In my invention, in various embodiments, one or both thumbs are used to activate both spacebar and/or backspace/erase keys.

Any method whereby one thumb, either thumb, or both thumbs are used to backspace/erase comprises my invention. This may comprise, but is not limited to, splitting the standard spacebar into two or more sections with one or more of these sections used for backspace/erase and one or more of the sections used for spacebar. It may also comprise one or more additional keys placed conveniently near the thumbs so that one or two thumbs can be used for backspace/erasing without averting the eyes from the copy.

The invention, in its various embodiments, solves each of the problems associated with prior art in a superior and wholly satisfactory manner.

DETAILED DESCRIPTION OF THE INVENTION

Previous art keyboards 10 (FIG. have not provided touch typists with ergonomically effective means to backspace and erase mistakes without averting the eyes from the copy. The present invention, in different embodiments, involves alternative methodologies which solve this and other problems associated with prior art. It does this by using one or both thumbs to activate the backspace/erase key, thereby removing the impediments of having to avert the eyes from the copy and/or having to stretch unnecessarily to backspace/erase.

Any method employing one or both thumbs in any combination to backspace/erase or, additionally, simply to backspace without erasing comprises my invention.

Figure 1:
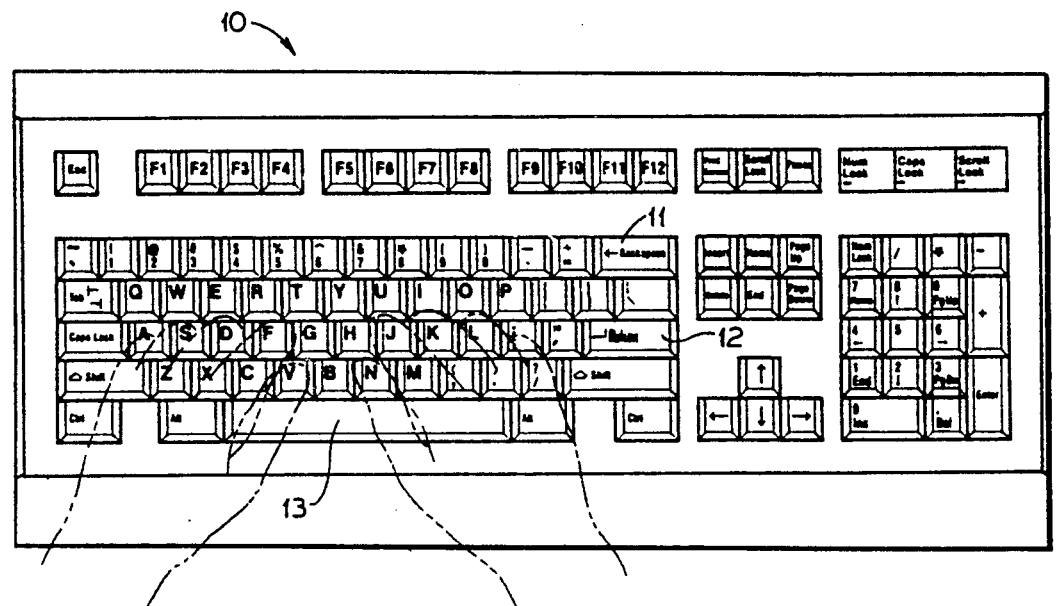
FIG. 1 is a top view of a prior art keyboard.
Figure 2:
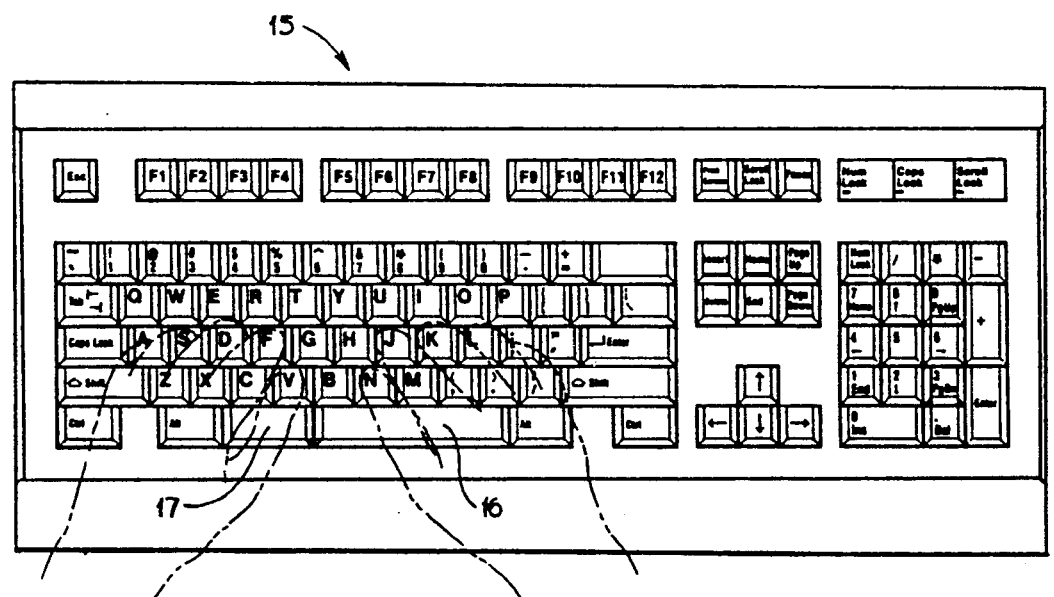
FIG. 2 is a too view of a keyboard having a backspace/erase key according to the present invention.

In one keyboard 15 embodiment, as shown in FIG. 2, the standard spacebar becomes divided into two separate bars 16,17, possibly, but not necessarily, of equal length. One of these 16 is used by one of the thumbs to provide spaces and the other key 17 is used by the other thumb to backspace/erase. Alternatively, the user could use the same thumb to activate either the spacebar key or the backspace/erase key. Hence the user can readily correct mistakes simply, easily, and efficiently without taking the eyes off of the copy.

Figure 3:
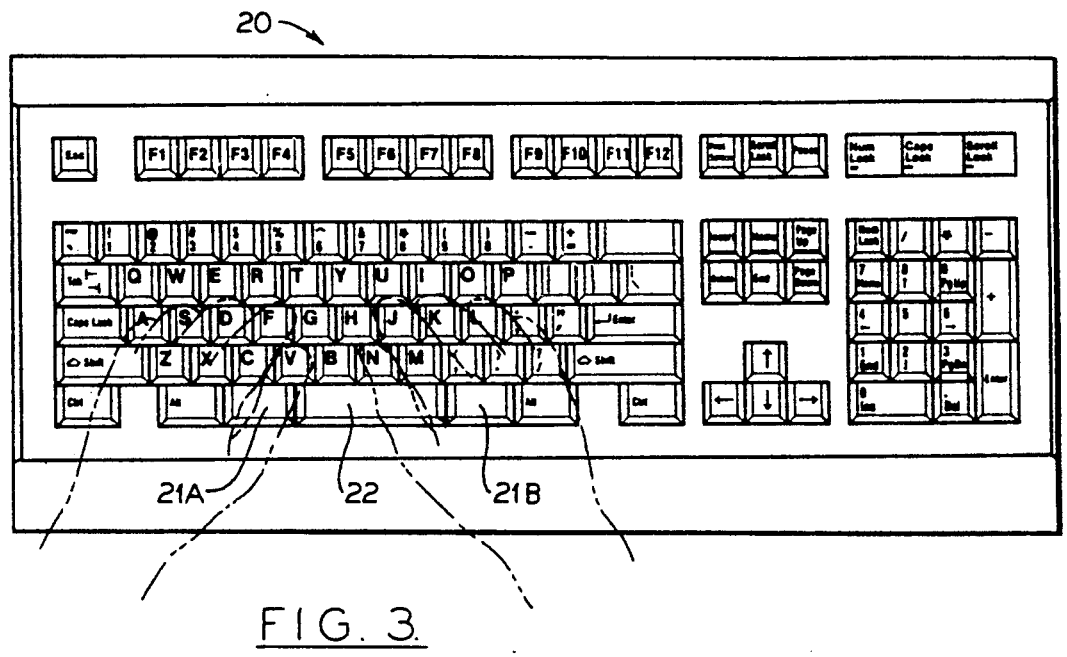
FIG. 3 is a too view of another embodiment of a keyboard having a backspace/erase key according to the present invention.

A second keyboard 20 embodiment, as shown in FIG. 3, entails division of the standard spacebar into three 21A,21B,22 or more sections with one of these sections, probably, but not necessarily, the middle one 22, used by either thumb the typist chooses to backspace/erase. The other sections 21A,21B could maintain the standard function of spacing. Alternatively, one or more of these other sections then might take on yet one or more other functions.

Figure 4:
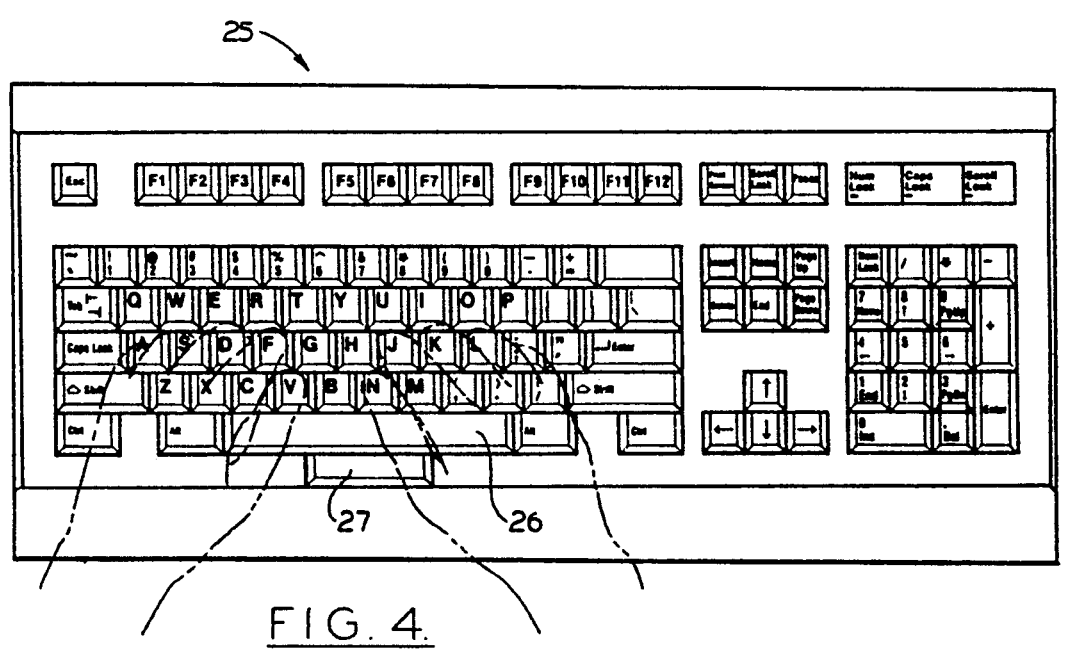
FIG. 4 is a too view of another embodiment of a keyboard having a backspace/erase key according to the present invention.
Figure 5:
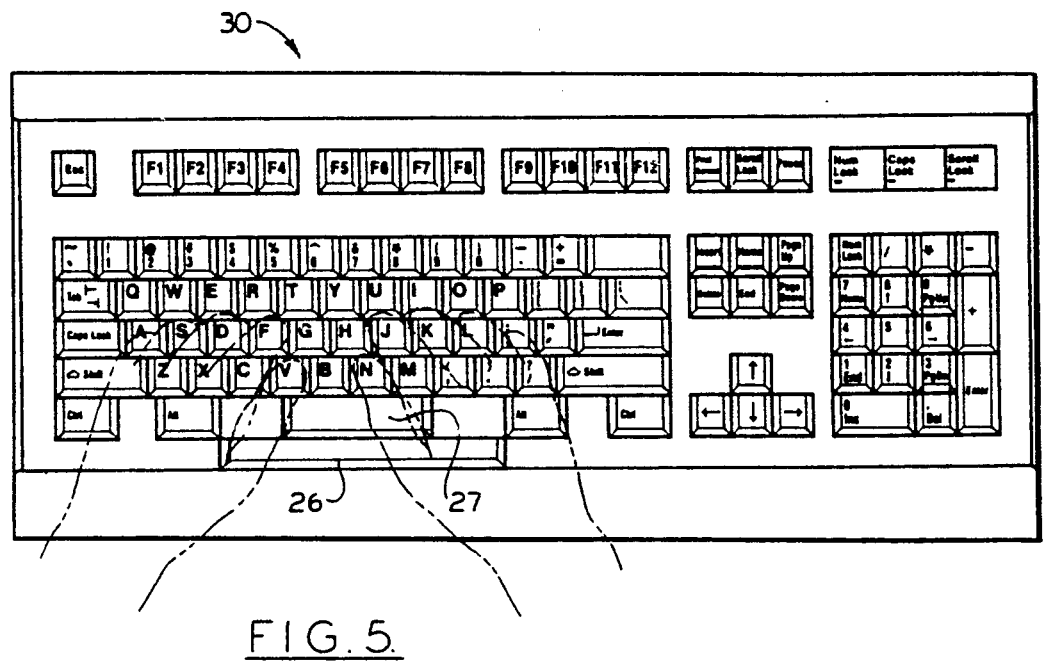
FIG. 5 is a too view of another embodiment of a keyboard having a backspace/erase key according to the present invention.

A third keyboard 25,30 embodiment, as shown in FIGS. 4 and 5 entails introduction of one or more additional keys 27, possibly but not necessarily elongated, close to the location of the standard spacebar 26 which could be used by one, either, or both thumbs to backspace/erase.

Figure 6:
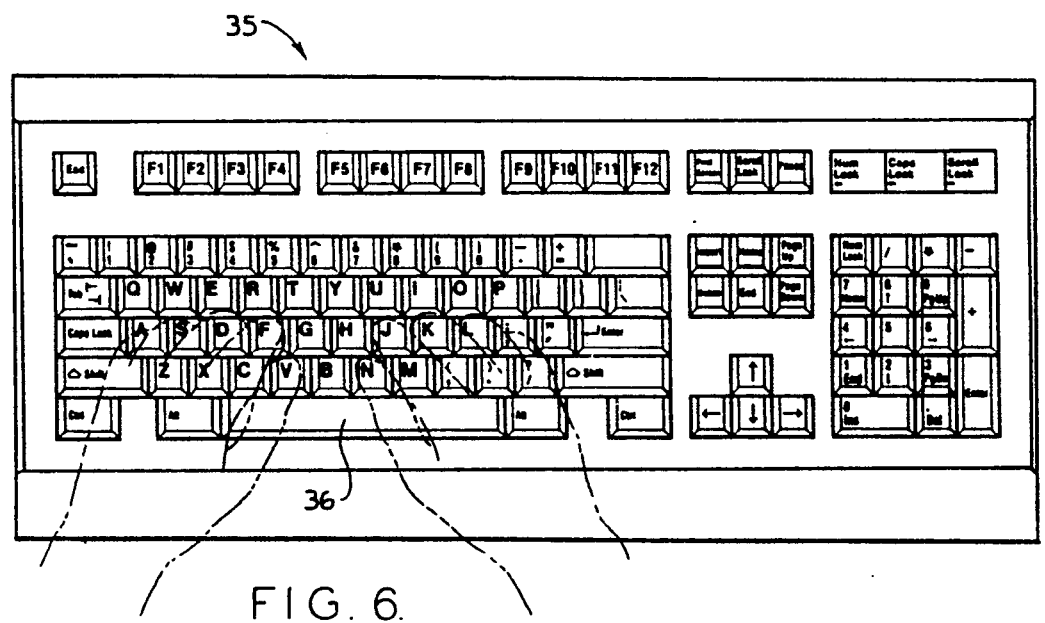
FIG. 6 is a top view of another embodiment of a keyboard having a backspace/erase key according to the present invention.

A fourth keyboard embodiment, as shown in FIG. 6, comprises a key 36 which registers a space when one thumb activates it but registers a backspace/erase when both thumbs activate it. Alternatively, a space could be activated by both thumbs and a backspace/erase by only one.

A fifth embodiment comprises a single elongated key 36 which registers a space when one region of it, such as but not limited to one side, is activated, and registers a backspace/erase when another region of it, such as but not limited to the other side, is activated.

Yet another embodiment comprises two keys either of which registers a space when activated individually but registers a backspace/erase when both are activated simultaneously.

Figure 7:
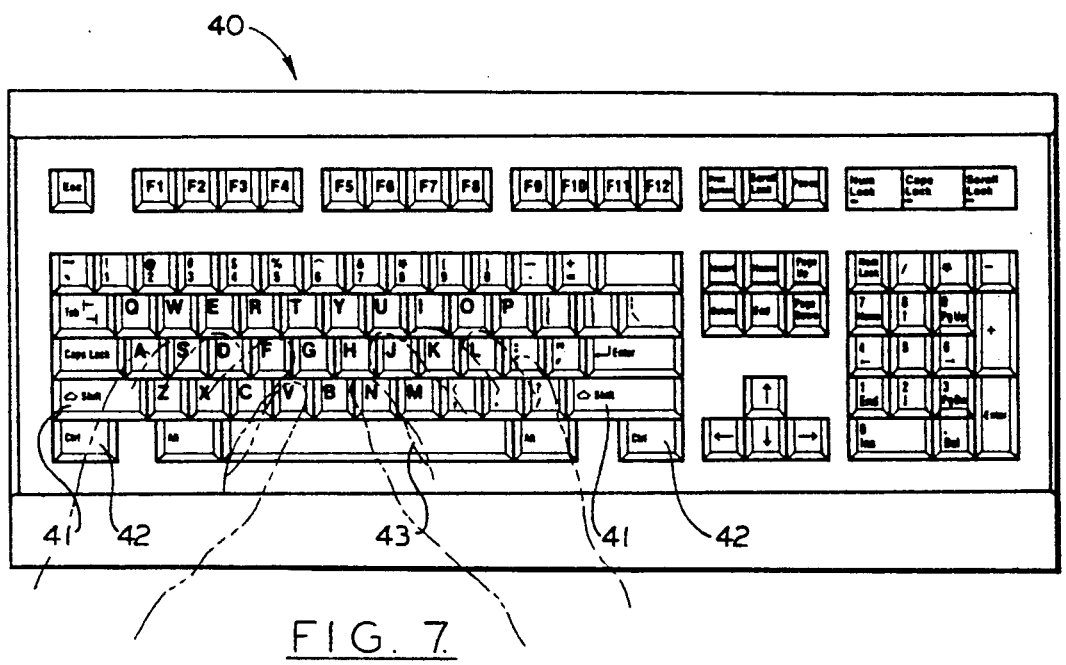
FIG. 7 is a top view of another embodiment of a keyboard having a backspace/erase key according to the present invention.

Still another keyboard embodiment, as shown in FIG. 7, comprises using another key, such as but not limited to the shift key 41 or the control key 42, in conjunction with a thumb activated key in order to backspace/erase. The user activates the other key then activates via movement of one or both thumbs a second key such as, but not limited to, the spacebar 43 in order to backspace/erase. These two keys could be activated simultaneously or sequentially.

This invention can thus be seen to solve all of the problems delineated in the "Description of Prior Art" section presently associated with computer and electric typewriter keyboards in a simple and novel manner.

While the above description contains many specificities, the reader should not construe these as limitations on the scope of the invention, but merely as exemplifications of preferred embodiments thereof. Those skilled in the art will envision many other possibilities that are within its scope. For example any of the embodiments could use any shape, dimensions, or number of keys located in many different locations. The keys could be of any material and do not necessarily have to function by depression, but could respond simply to touch, thumb temperature, or other means. Further the invention is not restricted to computer and electric typewriter keyboards but can be used in any type of input typing system. It could also be used simply for backspacing without erasing. Additionally, the keyboard could be designed such that the configuration of which keys are used for space and which for backspace/erase could be set by the user according to his desire. Accordingly, the scope of the invention should be determined not by the embodiments described, but by the appended claims and their legal equivalents.

I claim:

1. A keyboard for a computer, electronic typewriter, word processor and the like, comprising:
   a plurality of alphanumeric keys arranged corresponding to touch typing position;
   at least one backspace/erase key positioned within reach of at least one thumb of a typist having fingers positioned on said alphanumeric keys in touch typing position, said at least one backspace/erase key, automatically causing both backspacing to, and erasure of, at least one typed character is response to a single depression thereof; and
   at least one space key positioned within reach of at least one thumb of a typist having fingers positioned on said alphanumeric keys in touch typing position, and wherein said at least one backspace/erase key is positioned adjacent said at least one space key.

2. The keyboard of claim 1 wherein said at least one space kay is one space kay, wherein said at least one backspace/erase key is one backspace/erase key, and wherein said one backspace/erase key is positioned in end-to-end relation with said one space key.

3. The keyboard of claim 1 wherein said at least one space kay is two space keys, wherein said at least one backspace/erase key is one backspace/erase key, and wherein said backspace/erase key is positioned between said two space keys.

4. The keyboard of claim 1 wherein said at least one backspace/erase key is tow backspace/erase keys, wherein said at least one space key is one space key, and wherein said space key is positioned between said two backspace/erase keys.

5. The keyboard of claim 1 wherein said at least one space key is positioned adjacent said alphanumeric keys, and wherein said at least one backspace/erase key is positioned adjacent said space kay on a side thereof opposite said alphanumeric keys.

6. The keyboard of claim 1 wherein said at least one backspace/erase key comprises a plurality of backspace/erase keys.

7. The keyboard of claim 1 wherein said at least one backspace/erase key is positioned between said alphanumeric keys and said at least one space key.

8. The keyboard of claim 1 wherein said at least one backspace/erase key comprises a plurality of backspace/erase key.

9. The keyboard of claim 1 wherein said at least one backspace/erase key comprises an elongate key.

* * * * *

UNITED STATES PATENT AND TRADEMARK OFFICE
CERTIFICATE OF CORRECTION

PATENT NO. : 5,143,462

DATED : September 1, 1992

INVENTOR(S) : Klauber

It is certified that error appears in the above-indentified patent and that said Letters Patent is hereby corrected as shown below:

Column 1, line 14, omit "2." in sub-title.

Column 1, line 42, after "FIG." please insert —1,—.

Column 2, line 29, "too" should be --top--.

Column 2, line 31, "too" should be --top--.

Column 2, line 34, "too" should be --top--.

Column 2, line 37, "too" should be --top--.

Column 2, line 49, after "FIG." please insert —1)—.

Column 4, line 19, please delete "is" and substitute --in-- therefor.

UNITED STATES PATENT AND TRADEMARK OFFICE
CERTIFICATE OF CORRECTION

PATENT NO. : 5,143,462
DATED : September 1, 1992
INVENTOR(S) : Klauber

Page 2 of 2

It is certified that error appears in the above-indentified patent and that said Letters Patent is hereby corrected as shown below:

Column 4, line 29, (two occurrences) "kay" should be --key--.

Column 4, line 34, "kay" should be --key--.

Column 4, line 39, "tow" should be --two--.

Column 4, line 46, "kay" should be --key--.

Column 4, line 48, "1" should be --5--.

Column 4, line 54, "1" should be --7--.

Column 4, line 56, "key" should be --keys--.

Signed and Sealed this

Twenty-fifth Day of October, 1994

Attest:

Attesting Officer

BRUCE LEHMAN

Commissioner of Patents and Trademarks